United States Patent Office 3,063,951
Patented Nov. 13, 1962

3,063,951
POLYMERIC AMIDOXIMES AND THEIR DERIVATIVES AND A METHOD OF PREPARING SAME
Ferdinand Leonard Schouteden, Wilrijk-Antwerp, Belgium, assignor to Gevaert Photo-Producten, Mortsel-Antwerp, Belgium, a Belgian company
No Drawing. Filed Feb. 26, 1962, Ser. No. 175,791
7 Claims. (Cl. 260—2.1)

The present invention relates to new compositions of matter viz: to polymeric substances containing amidoxime groups and derivatives.

Low molecular weight amidoximes corresponding to the general formula

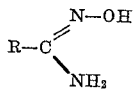

were described by Lossen (Ann. 166, 295 (1875), but in particular by Tiemann and P. Kruger (Ber. 57, 1685 (1884)).

Systematic studies on amidoximes are rather scarce and, as pointed out by Buu-Hoi and Cagniant (Grignard, Traite de Chimie Organique, XV, 710) it seems that attention was particularly directed to the aromatic series, probably owing to experimental difficulties.

In a more recent paper (S. Soloway et al., Anal. Chem., 24, 898 (1952)), the reaction of non-polymeric nitrile with hydroxylamine is used as a colorimetric test for nitriles.

Although low molecular amidoximes and reaction products thereof have been studied, polymeric amidoximes have not been described hitherto.

It has already been proposed to dye polyacrylonitrile fibers in the presence of hydroxylamine and cupric salts. The reaction is conducted at a pH of 1.5 to 5, conditions which exclude the formation of amidoximes. According to the prior proposal, it furthermore appears that the hydroxylamine or its derivatives act only as a reducing agent for the cupric salts (U.S.P. 2,653,074).

It has also been proposed to reduce the viscosity of polyacrylonitrile solutions in organic solvents by intimately mixing the polymer with a selected organic solvent and a minor proportion e.g. 0.1 to 5% of an inorganic acid salt of certain organic amines including hydroxylaminehydrochloride. It was pointed out in this prior disclosure that this modification of the viscosity of the solution appears to be a purely physical phenomenon (U.S.P. 2,671,066) and is obtained regardless of the organic solvent used and independently of whether the solvent is one which liberates an amine on heating or not.

An object of the present invention is a new class of polymers, heretofore unknown.

Another object relates to the formation of derivatives of these polymers.

A further object concerns new compositions of matter containing these polymers.

A still further object is to produce these polymers by means of a simple and economical process.

Still further objects are processes to produce derivatives of these polymers.

Another object is to use these compounds in the industrial arts wherein their unique outstanding properties are particularly advantageous.

Other objects and advantages will appear from the following description.

I have found that it is possible to prepare polymeric amidoximes, which term as used hereinafter in the specification and appended claims, is used to embrace all macromolecular substances containing amidoxime groups. Thus, according to the present invention, new polymeric materials consist of or comprise polymeric amidoximes or derivatives thereof.

The invention includes a process for the production of polymerim amidoximes as hereinbefore defined and comprises reacting a polymer, containing nitrile groups, with hydroxylamine until at least part of the nitrile groups have been reacted.

As it will be clearly seen from the following description, these new polymers as well as their derivatives are very useful in many industrial applications.

Although on the one hand it is known that low molecular weight amidoximes may be prepared by reacting an imino ether, amides and thioamides with hydroxylamine, or by reacting ammonia with chlorinated aldoximes, or by reducing oxyamidoximes or nitroso acids, and although there is a possibility that these reactions may also be applied to macromolecular substances, there are difficulties in obtaining corresponding polymeric starting materials which would render such processes uncommercial.

The basic reaction for the preparation of polymeric amidoximes according to my invention can be represented by the following general formula:

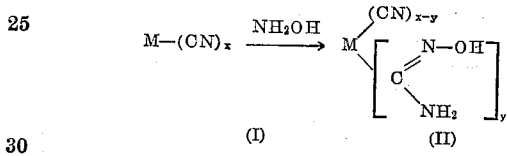

(I)          (II)

wherein M is the macromolecular part of the molecule, i.e., the macromolecular skeleton which can include other functional groups in addition to nitrile groups;

$x$ is the number of nitrile groups in the polymeric starting material; and $y$ is the number of amidoximes groups formed in the final reaction product.

The reaction may be continued until all the nitrile groups have reacted with hydroxylamine or it may be interrupted after an arbitrarily chosen period of time. The reaction may be performed either in one operation or stepwise. Furthermore, the basic reaction may be preceded, accompanied or followed by other reactions concerning one or more kinds of functional groups present in the macromolecular substance. Typical reactions which may precede or follow the amidoxime formation are, for example, complete or partial saponification or esterification of some functional groups, addition of alkylene oxides and/or acrylonitrile, acetal formation by reaction between polymers of the polyvinyl alcohol type and aldehydes, and esterification of carboxyl or anhydride groups with nitrile groups containing hydroxy compounds.

Typical examples of reactions accompanying the amidoxime-formation are, for example, inter- and/or intra-molecular ring-formation, neutralization of acid groups and the splitting out of hydrogen chloride in chlorine-containing copolymers. Where the macromolecular part contains

groups wherein X is a member of the group consisting of —$NH_2$, —NHR, —NRR', halogen or the complement to form anhydride groups, the hydroxylamine may simultaneously react with these groups with the formation of hydroxamic acid. Obviously, the sequence and the degree of these reactions may be chosen arbitrarily.

In carrying out the process of the present invention, any polymer containing nitrile groups may be used as starting material; for instance polymers, copolymers, block copolymers and graft copolymers from polymerisable nitriles and all combinations thereof, optionally cross-linked, and any natural or synthetic macromolecular substance cyano-ethylated with acrylonitrile and/or grafted with a polymerisable nitrile as well as polymers containing carboxyl or anhydride groups esterified with nitrile groups containing hydroxy compounds. Monomers convenient for the preparation of these polymers are for example, acrylonitrile, methacrylonitrile and vinylidene cyanide alone or in combination with other polymersiable materials. Macromolecular substances which may be cyanoethylated and/or grafted are for example, polyvinyl alcohol, polyvinylamine, polyacryl- or methacrylamide, cellulose, alginic acid, starch, zein, gelatin, casein as well as their derivatives. The present invention is not restricted to addition polymers but is also applicable to condensation polymers, both with linear or tridimensional structures.

The hydroxylamine may be used as the free base or in the form of its various known salts in which case the salts are neutralized in the reaction medium with suitable alkaline substances to liberate the hydroxylamine gradually or all at once, or the hydroxylamine can be liberated from hydroxylamine generating substances, for example, ammonium hypochlorite. The reaction may be carried out with the polymeric starting material in solution, as a dispersion or merely in the swollen state.

Varying the groups of independent variables, i.e., nature of starting materials, their molecular weight, degree of substitution and consecutive reactions, offers the possibility of a considerable number of combinations. The resultant polymeric amidoximes and their immediate derivatives possess unique properties and lend themselves to a wide variety of syntheses. Owing to the presence of OH— and —NH$_2$ groups, the new products are very reactive and will undergo the reactions characteristic of these groups separately or in combination. Thus, non-limiting examples include hydrolysis in water or alkaline medium, reaction with nitrous acid, with aniline, with an acylating agent, the addition of carbon disulfide in the presence or absence of potassium alcoholate, the formation of heterocyclic rings with acetic acid or with ethyl ester of acetyl acetic acid, the addition of alkylene oxides and/or of acrylonitrile.

For use of the polymeric amidoximes in practical applications, one of the most simple procedures consists in using the reaction mixture directly after filtration. When preferred, the filtered reaction mixture may be precipitated in a non-solvent and redissolved in proper solvents. The amidoximes produced from linear polymers, for instance, those obtained from polyacrylonitrile, wherein the nitrile groups are almost completely transformed into amidoxime groups are generally insoluble in water, but dissolve in dilute aqueous solutions of acid and alkali. Apparently, this solubility is due to the formation of water-soluble salts by neutralization respectively of the —OH groups or the —NH$_2$ groups in the polymer molecule. These solutions may be cast or subjected to spinning and after evaporation of the solvent, form films and fibers. I have also noted compatibility of these solutions with other polymer solutions, i.e., with aqueous solutions of gelatin, polyvinyl alcohol and polyvinyl pyrrolidone. Thus, they may be used to alter the properties of the primary solutions.

The polymers according to the process of my present invention and/or their derivatives have very useful film- and fiber-forming properties. They may be used for the manufacture of film base and/or outer- or inner layers in graphic- or photographic elements, as a raw material for the production of wrapping materials and as a coating on supports of any kind, for instance in paints, varnishes, lacquers, adhesives or a coating on films, foils, sheets, fibers and other shaped articles.

These polymeric amidoximes and derivatives can further be used in the preparation of paper, either as a modifying agent for the paper pulp or as an impregnating agent of the paper band formed. Especially valuable layers are those formed by chemical reaction of the nitrile groups containing shaped article with hydroxylamine. Used in combination with other film forming polymers, they are capable of altering the properties of the film made from these polymers.

In the textile field, they may be used equally well as raw materials for the manufacture of new synthetic fibers, or to improve the properties of other known fibers. An application of outstanding interest consists in their use to improve the properties, especially the dyeability, of nitrile group containing fibers.

Added to other colloidal solutions, they have a marked influence on the rheological properties of these solutions. This is of special interest in the manufacture of photographic elements where it is often desirable to alter the viscosity and the gelling point of the emulsions. Furthermore, they may be used as dispersing and/or binding agents in light-sensitive emulsions. Their ability to bind or to fix different chemical substances makes them very useful particularly in elements where diffusion of chemical substances, dyes and color components have a disadvantageous effect on the quality of the product. Another application consists in their use as smoke filters in cigarettes. Under certain conditions, the fixing of other chemicals is reversible, thus they may be used as ion-exchange resins preferably in the form of granules or fabrics.

The following examples illustrate my invention. They are, however, not intended to be restrictive of the invention. Thus, modifications may be devised by one skilled in the art which will fall within the spirit and scope of the invention.

EXAMPLE 1

A. *Preparation of Polyacrylonitrile*

50 grams freshly distilled acrylonitrile are mixed with 500 ml. thiophene free benzene and 0.200 grams benzoylperoxide. 150 ml. of this solution are introduced into a round bottom flask and heated on the water-bath, so that the mixture constantly boils. Introduction of a supply of oxygen-free and dry nitrogen protects the reaction mixture from inhibition by oxygen. After 20–30 minutes, polymerization sets in and the remaining solution is added dropwise over a period of two hours. Heating is continued for an additional four hours in order to complete the polymerization. The polyacrylonitrile formed is suction-filtered, repeatedly washed with petroleum ether and dried.

B. *Reaction With Hydroxylamine*

One gram polyacrylonitrile from Example 1A above is dispersed in 80 ml. water. When 2.9 grams hydroxylaminehydrochloride are added and dissolved in this mixture, the hydroxylaminehydrochloride is partially neutralized with 1.52 grams anhydrous sodium carbonate. The reaction mixture is heated on the water bath at 75° C. and slowly stirred for six hours. The polymer is suction-filtered, thoroughly washed with water and dried. It swells in sodium hydroxide solutions, still more in hydrogen chloride solutions, and the swollen particles are dyed to red-brown with a ferric chloride solution.

EXAMPLE 2

One gram polymethacrylonitrile and 2.1 grams hydroxylamine hydrochloride are dissolved in 20 ml. dimethylformamide, 3.8 ml. of a 40% aqueous sodium carbonate solution are added and the whole is heated for two hours at 75° C. The sodium chloride formed is suction-filtered and the solution precipitated in methanol and the precipitate is washed several times with methanol. The polymer when dried contains 19.5% N$_2$. It is soluble in 0.1 normal sodium hydroxide and in 0.1 normal hydrogen chloride. The hydrogen chloride solution of the polymer develops a deep red color upon addition of ferric chloride.

EXAMPLE 3

10 grams of a copolymer, consisting of 39 mol percent of acrylonitrile and 61 mol percent of methacrylic acid are dissolved in 60 ml. denaturated ethanol and mixed with a solution of eight grams hydroxylamine hydrochloride in 60 ml. of the same solvent. When the temperature has been raised to 50–60° C., 6.1 grams anhydrous sodium carbonate, dissolved in 30 ml. water, are dropwise added and the reaction continued for eight hours. The precipitate formed is washed with ethanol, suction-filtered, gently dried and redissolved in water. The pH is adjusted to 3.5 by addition of 0.1 normal hydrogen chloride solution and the polymer precipitates again. The precipitate, repeatedly washed with ethanol, is suction-filtered and dried. Yield: 12 grams. The polymer obtained contains 9.4% $N_2$ and is insoluble in aqueous medium of a pH range between 3 and 6.

EXAMPLE 4

10 grams of Orlon fibers are immersed in a solution containing 21 grams hydroxylamine hydrochloride in 500 ml. water to which 15 grams anhydrous sodium carbonate are added. The mixture is heated at its boiling point for about 30 minutes while slowly stirring. After this time, the fibrous mass is thoroughly washed with water and finally centrifuged and dried in an air current. A small sample treated with a warm diluted ferric chloride solution takes up all the ferric ions; the solution itself remains colorless after addition of ammonium thiocyanate solution, showing the absence of ferric ions in the solution.

In the above examples, it is necessary that the pH of the reaction medium remain essentially neutral or slightly acidic. Thus, the only alkaline material present in the reaction medium is that needed to liberate the hydroxylamine from its salt, or from hydroxylamine generating compounds.

Additionally, "aqueous medium" as employed in the claims and specification is used in contra-distinction to water-free and merely means that there must be at least 10% water present. Thus, mixtures of non-aqueous solvents and water are operable and are claimed herein.

This application is a continuation-in-part of my co-pending application filed September 19, 1955, Serial No. 535,295, now abandoned.

It should be appreciated that the instant invention is not to be construed as being limited by the illustrative examples. It is possible to produce still other embodiments without departing from the inventive concept herein disclosed. Such embodiments are within the ability of one skilled in the art.

What is claimed is:

1. A process for producing high polymers characterized by a plurality of amidoxime groups which comprises heating in an aqueous medium a high polymer selected from the group consisting of a polymer of acrylonitrile, a polymer of methacrylonitrile, a polymer of vinylidene cyanide, cyanoethylated polyvinyl alcohol, cyanoethylated cellulose, cyanoethylated polyvinyl amine, cyanoethylated polyacrylamide and cyanoethylated polymethacrylamide with free hydroxylamine, sufficient to theoretically transform substantially all of the —CN groups, with the formation of amidoxime groups.

2. A process for producing high polymers characterized by a plurality of amidoxime groups which comprises heating in an aqueous medium a polymer of acrylonitrile with free hydroxylamine, sufficient to theoretically transform substantially all of the —CN groups, with the formation of amidoxime groups.

3. A process for producing high polymers characterized by a plurality of amidoxime groups which comprises heating in an aqueous medium cyanoethylated cellulose with free hydroxylamine, sufficient to theoretically transform substantially all of the —CN groups, with the formation of amidoxime groups.

4. A polymer characterized by a plurality of amidoxime groups prepared according to the process of claim 1.

5. A process for producing high polymers characterized by a plurality of amidoxime groups which comprises heating in an aqueous medium a high polymer selected from the group consisting of a polymer of acrylonitrile, a polymer of methacrylonitrile, a polymer of vinylidene cyanide, cyanoethylated polyvinyl alcohol, cyanoethylated cellulose, cyanoethylated polyvinyl amine, cyanoethylated polyacrylamide and cyanoethylated polymethacrylamide with an hydroxylamine salt, sufficient to theoretically transform substantially all of the —CN groups, with the formation of amidoxime groups, there being added to the reaction medium no more alkali than necessary to free the hydroxylamine.

6. A process for producing high polymers characterized by a plurality of amidoxime groups which comprises heating in an aqueous medium a polymer of acrylonitrile with an hydroxylamine salt, sufficient to theoretically transform substantially all of the —CN groups, with the formation of amidoxime groups, there being added to the reaction medium no more alkali than necessary to free the hydroxylamine.

7. A process for producing high polymers characterized by a plurality of amidoxime groups which comprises heating in an aqueous medium cyanoethylated cellulose with an hydroxylamine salt, sufficient to theoretically transform substantially all of the —CN groups, with the formation of amidoxime groups, there being added to the reaction medium no more alkali than necessary to free the hydroxylamine.

References Cited in the file of this patent

UNITED STATES PATENTS

| | | |
|---|---|---|
| 1,984,417 | Mark et al. | Dec. 18, 1934 |
| 2,495,286 | Brubaker | Jan. 24, 1950 |
| 2,671,066 | Justice | Mar. 2, 1954 |
| 2,727,835 | Barrett | Dec. 20, 1955 |
| 2,739,136 | Kharasch et al. | Mar. 20, 1956 |
| 2,792,276 | Kaupin et al. | May 14, 1957 |